No. 774,429. Patented November 8, 1904.

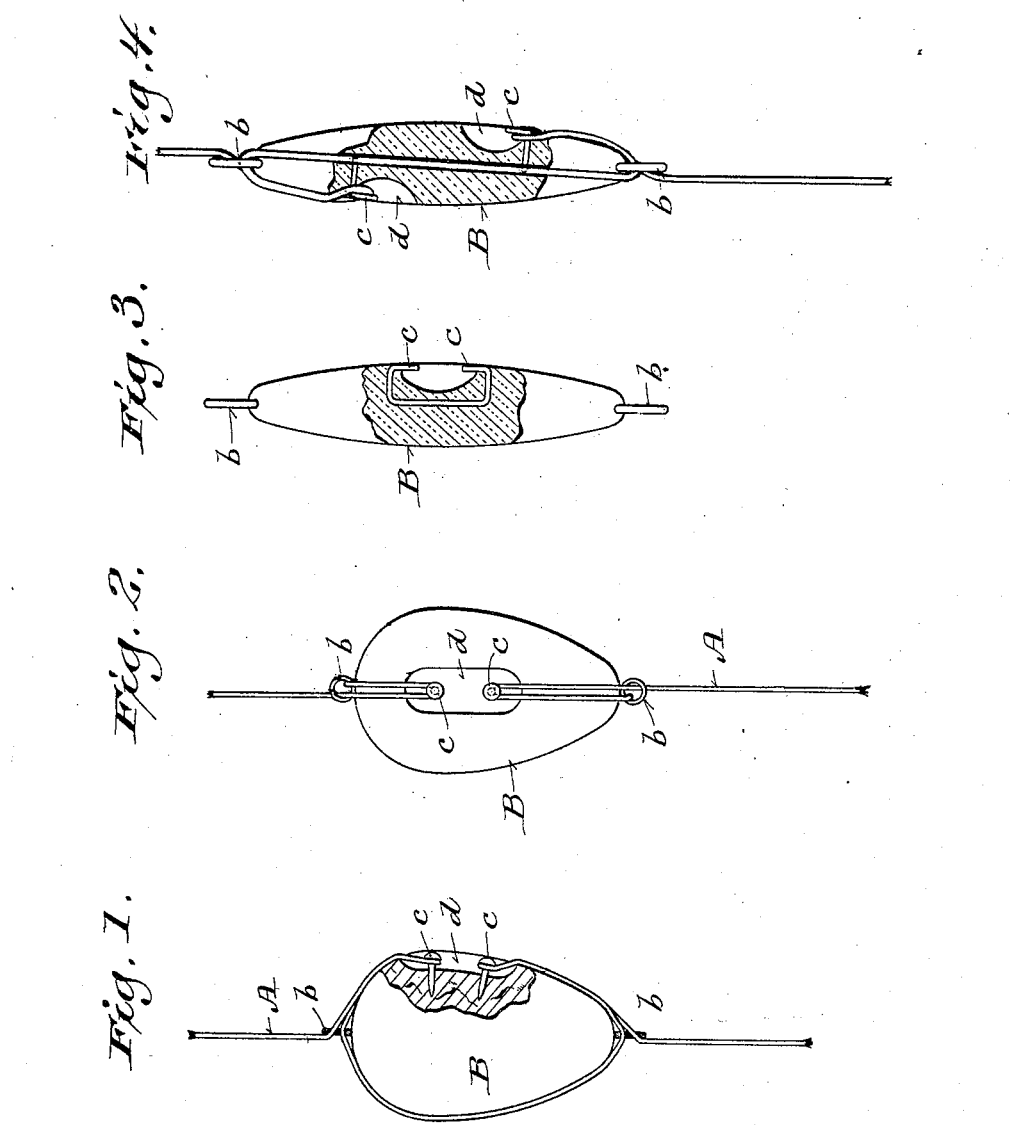

UNITED STATES PATENT OFFICE.

GEORGE K. HURLBUT, OF MILWAUKEE, WISCONSIN, ASSIGNOR OF ONE-HALF TO ALBERT F. BINGENHEIMER, OF MILWAUKEE, WISCONSIN.

FISHING-TACKLE.

SPECIFICATION forming part of Letters Patent No. 774,429, dated November 8, 1904.

Application filed January 28, 1904. Serial No. 190,953. (No model.)

*To all whom it may concern:*

Be it known that I, GEORGE K. HURLBUT, a citizen of the United States, and a resident of Milwaukee, in the county of Milwaukee and State of Wisconsin, have invented certain new and useful Improvements in Fishing-Tackle; and I do hereby declare that the following is a full, clear, and exact description thereof.

My invention has for its object to facilitate connection of fishing-lines and attachments, such as bobs and sinkers; and it consists in what is hereinafter particularly set forth with reference to the accompanying drawings and subsequently claimed.

Figure 1 of the drawings represents a partly sectional elevation of a bob attachment in accordance with my invention on a fishing-line; Fig. 2, an elevation of the same from a different point of view; Fig. 3, a partly sectional elevation of a sinker attachment in accordance with my invention detached from the line; and Fig. 4, a similar view of another form of sinker attachment.

Referring by letter to the drawings, A indicates a fishing-line, and B an attachment for the same. This attachment, whether bob or sinker, has an eye $b$ at each end thereof and is preferably provided with a pair of side prongs $c$, although in some instances one such prong may be sufficient. It is also preferable to have the side prong or prongs countersunk in a recess or recesses $d$ of the attachment.

Loops of the fishing-line are passed through the end eyes of an attachment and caught on a prong or prongs of same, whereby said attachment is firmly held in place when the line-loops are drawn taut, the reverse of this operation being performed to remove the attachment from said line.

In Figs. 1 and 2 are shown two prongs, each of which is a headed pin driven into a recessed portion of the line attachment far enough to countersink its head.

In Fig. 3 the prongs are exposed ends of a suitably-bent piece of wire molded in the line attachment central of the same, said prongs being countersunk in a central side recess of said attachment and projecting longitudinally of the same in opposite directions.

In Fig. 4 there are shown two suitably-bent pieces of wire molded in the line attachment, the outer end of each wire being a prong countersunk in one of two recesses with which said attachment is provided on opposite sides, and, like in Fig. 3, the prongs project in opposite directions longitudinally of the aforesaid attachment. In this form of attachment loops of the line are passed through the end eyes in opposite directions and caught on the prongs, a portion of said line being laid along said attachment from eye to eye of same.

Having thus described my invention, what I claim as new, and desire to secure by Letters Patent, is—

1. A fishing-line attachment having end eyes and provided laterally thereof with means on which to catch loops of the line passed through said eyes.

2. A fishing-line attachment having end eyes and provided laterally thereof with countersunk means on which to catch loops of the line passed through said eyes.

3. A fishing-line attachment having end eyes, a side recess and prongs within the recess for the engagement of line-loops passed through said eyes.

In testimony that I claim the foregoing I have hereunto set my hand, at Milwaukee, in the county of Milwaukee and State of Wisconsin, in the presence of two witnesses.

G. K. HURLBUT.

Witnesses:
N. E. OLIPHANT,
HUGO FAHL.